(12) United States Patent
Murakami et al.

(10) Patent No.: US 8,587,257 B2
(45) Date of Patent: Nov. 19, 2013

(54) SECONDARY BATTERY DEVICE AND VEHICLE

(75) Inventors: Masayuki Murakami, Higashikurume (JP); Kenji Nakano, Kodaira (JP); Shinichiro Kosugi, Saku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 425 days.

(21) Appl. No.: 12/963,021

(22) Filed: Dec. 8, 2010

(65) Prior Publication Data

US 2011/0140669 A1    Jun. 16, 2011

(30) Foreign Application Priority Data

Dec. 16, 2009  (JP) .................................. 2009-285422

(51) Int. Cl.
*H02J 7/00*         (2006.01)
(52) U.S. Cl.
USPC ......................................... 320/134; 320/136
(58) Field of Classification Search
USPC ........................................................ 320/134
See application file for complete search history.

(56) References Cited

U.S. PATENT DOCUMENTS

| 7,714,540 B2 | 5/2010 | Shibuya et al. |
| 2009/0198399 A1* | 8/2009 | Kubo et al. ..................... 701/22 |
| 2011/0149454 A1 | 6/2011 | Shibuya et al. |

FOREIGN PATENT DOCUMENTS

| JP | 05-046426 A | 2/1993 |
| JP | 2001-063492 A | 3/2001 |
| JP | 2009-219215 A | 9/2009 |

* cited by examiner

*Primary Examiner* — Drew A Dunn
*Assistant Examiner* — Robert Grant
(74) *Attorney, Agent, or Firm* — Holtz, Holtz, Goodman & Chick, PC (57) ABSTRACT

A battery device includes secondary battery cells, a detector configured to detect respective voltages of the cells, a first circuit configured to output an overvoltage alarm signal for notifying whether each of the voltage values of the cells is an overvoltage equal to or more than a threshold value, a second circuit configured to output a first level shutdown signal to an upper controller when any of the secondary battery cells is judged to be overvoltage by the overvoltage alarm signal, and a third circuit configured to be supplied with the shutdown signal and to control operations of the first circuit and the second circuit. The second circuit assumes the shutdown signal at a second level when making self-diagnosis on the first circuit, and outputs an alarm signal for notifying the third circuit of, when the overvoltage alarm signal noticing an overvoltage is supplied, the overvoltage.

5 Claims, 8 Drawing Sheets

SECONDARY BATTERY DEVICE AND VEHICLE

CROSS-REFERENCE TO RELATED APPLICATIONS

This application is based upon and claims the benefit of priority from Japanese Patent Application No. 2009-285422, filed Dec. 16, 2009; the entire contents of which are incorporated herein by reference.

FIELD

Embodiments described herein relate generally to a secondary battery device, and a vehicle.

BACKGROUND

A control system mounted on vehicles such as railroads or automobiles and plants requires high safety, and needs a safety system for stopping the system for emergency or leading it to fail-safe.

Since when the safety system does not function due to some failure at a time of control system abnormality, a disaster can be lead, high reliability is required for the safety system. Thus, when the control system actually function abnormally, it is necessary to periodically confirm whether the safety system functions as expected.

In order to confirm the operation of the safety system, there is known a method for giving a simulated abnormality to an input part of the safety system and periodically confirming whether an output (operation) as expected can be obtained, thereby ensuring reliability. There is conventionally known a method for giving a simulated abnormality and diagnosing whether a diagnosing device functions normally.

Failures of the safety system are broadly divided into safe failure and dangerous failure. The safe failure is a failure leading the control system to shutdown (that is, safety state), and the dangerous failure is a failure by which the safety system does not function as needed. Further, the dangerous failure is divided into a dangerous failure in which a failure can be detected by self-diagnosis and a dangerous failure in which a failure cannot be detected.

If a failure can be detected by self-diagnosis even if it is a dangerous failure, the failure can be regarded as equivalent to the safe failure, and it is essential to reduce the rate of dangerous failures in which a failure cannot be detected for increasing safety performance of the safety system.

The safety system is configured of a sensor, a controller and an actuator, for example. The sensor detects states of the systems (controlled device and control system), the controller judges whether the system functions normally or abnormally, and if abnormally, the actuator stops the system.

In this case, if a pseudo abnormal value is generated in the sensor, and whether a shutdown signal from the controller can be received in front of the actuator is periodically diagnosed, a self-diagnosis rate of the safety system can be enhanced. At this time, a shutdown signal for self-diagnosis and an original shutdown signal must be discriminated from each other such that the system is not shut down due to the pseudo abnormal value for self-diagnosis.

As a method for discriminating a shutdown signal for self-diagnosis and an original shutdown signal, there is proposed, for example, a method for discriminating both the signals based on pulse widths of the shutdown signals. A self-diagnosis processor within the controller sends a signal for notifying the self-diagnosis to the sensor, and the sensor receives the signal and then generates a shutdown signal having a pulse width as short as a time width t1, for example. The shutdown signal output from the sensor is supplied to the self-diagnosis processor and the self-diagnosis processor detects that the shutdown signal is activated. When the sensor detects an actual abnormality, the shutdown signal is continuously being activated.

A filter is arranged in front of the actuator, and the filter sends an activated signal to the actuator after a time width t2 (t1<t2) since the shutdown signal was actuated. There is proposed a method for not detecting a failure state until a certain period of time elapses.

DETAILED DESCRIPTION

A secondary battery device according to an embodiment comprises an assembled battery including a plurality of secondary battery cells, a voltage detector configured to detect respective voltages of the plurality of secondary battery cells, a diagnosing circuit configured to output an overvoltage alarm signal for notifying whether each of the voltage values of the plurality of secondary battery cells detected by the voltage detector is an overvoltage equal to or more than a predetermined threshold value, a shutdown signal generating circuit configured to output a first level shutdown signal to an upper controller when any of the secondary battery cells is judged to be overvoltage by the overvoltage alarm signal, and a controlling circuit configured to be supplied with the shutdown signal and to control operations of the diagnosing circuit and the shutdown signal generating circuit. The shutdown signal generating circuit assumes the shutdown signal at a second level when making self-diagnosis on the diagnosing circuit, and outputs an alarm signal for notifying the controlling circuit of, when the overvoltage alarm signal noticing an overvoltage is supplied, the overvoltage.

Figure 1:
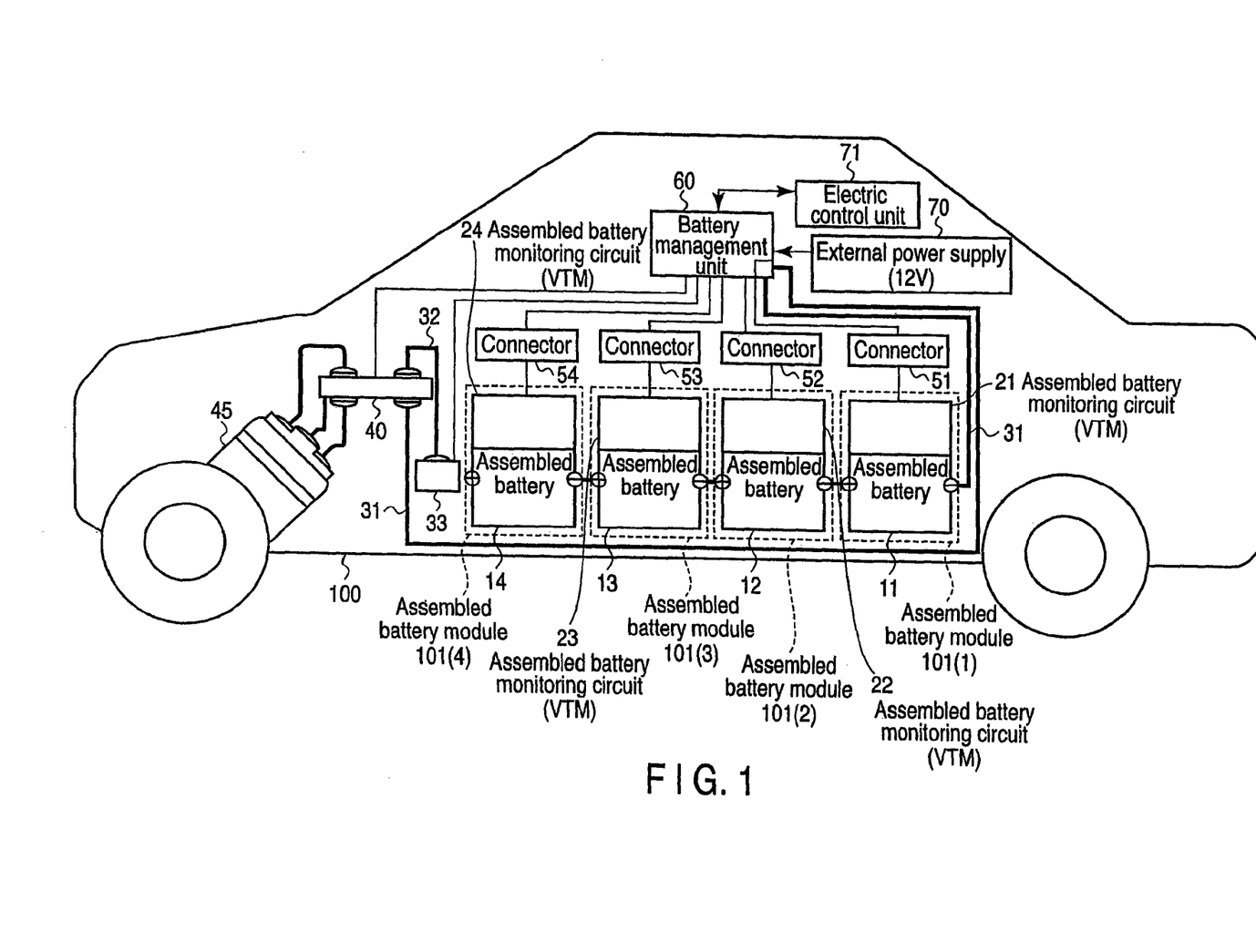
FIG. 1 is a diagram schematically showing a structure example of a vehicle mounting a secondary battery device thereon according to an embodiment of the present invention.

A secondary battery device and a vehicle according to an embodiment of the present invention will be described below with reference to the drawings. FIG. 1 explains an example in which the secondary battery device according to the present embodiment is mounted on the vehicle 100. The vehicle 100 comprises an axle configured to be driven by power of the secondary battery device according to the present embodiment. The vehicle 100, a point where the secondary battery device is mounted on the vehicle 100, and a drive motor of the vehicle 100 are schematically shown in FIG. 1.

In the secondary battery device, a plurality of assembled battery modules 101(1), 101(2), . . . 101(4) are connected mutually in series. The assembled battery modules 101(1), 101(2), . . . 101(4) can be independently removed and can be replaced with another assembled battery module.

A negative terminal of the assembled battery module 101 (1) at the lower side of the secondary battery device (the side where the voltage is lower is called lower side) is connected to one terminal of a connection line 31. The connection line 31 is connected to a negative input terminal of an inverter 40 via a current detector within a battery management unit 60 described later.

A positive terminal of the assembled battery module 101 (4) at the higher side of the secondary battery device (the side where the voltage is higher is called higher side) is connected to a terminal of a connection line 32 via a switch device 33. The other terminal of the connection line 32 is connected to a positive input terminal of the inverter 40.

The switch device (actuator) 33 includes a precharge switch SWP (shown in FIG. 4) configured to be turned on when a battery is charged and a main switch SWM (shown in FIG. 4) configured to be turned on when a battery output is supplied to a load. The precharge switch SWP and the main switch SWM comprise a relaying circuit configured to be turned on and off depending on a signal supplied to a coil arranged near the switch device.

The inverter 40 converts an input DC voltage to a 3-phase AC high voltage for motor drive. An output voltage of the inverter 40 is controlled based on a control signal from the battery management unit (BMU) 60 or an electric control unit (ECU) 71 as upper control unit configured to control the entire operation of the vehicle. The 3-phase output terminal of the inverter 40 is connected to each 3-phase input terminal of the motor 45. A rotation of the motor 45 is transmitted to the axle and the drive wheels WR, WL via a differential gear unit, for example.

An independent external power supply 70 is connected to the battery management unit 60. The external power supply 70 is a lead storage battery having rated 12V. The electric control unit 71 configured to manage the entire vehicle in response to a driver's operation input is also connected to the battery management unit 60.

Figure 2:
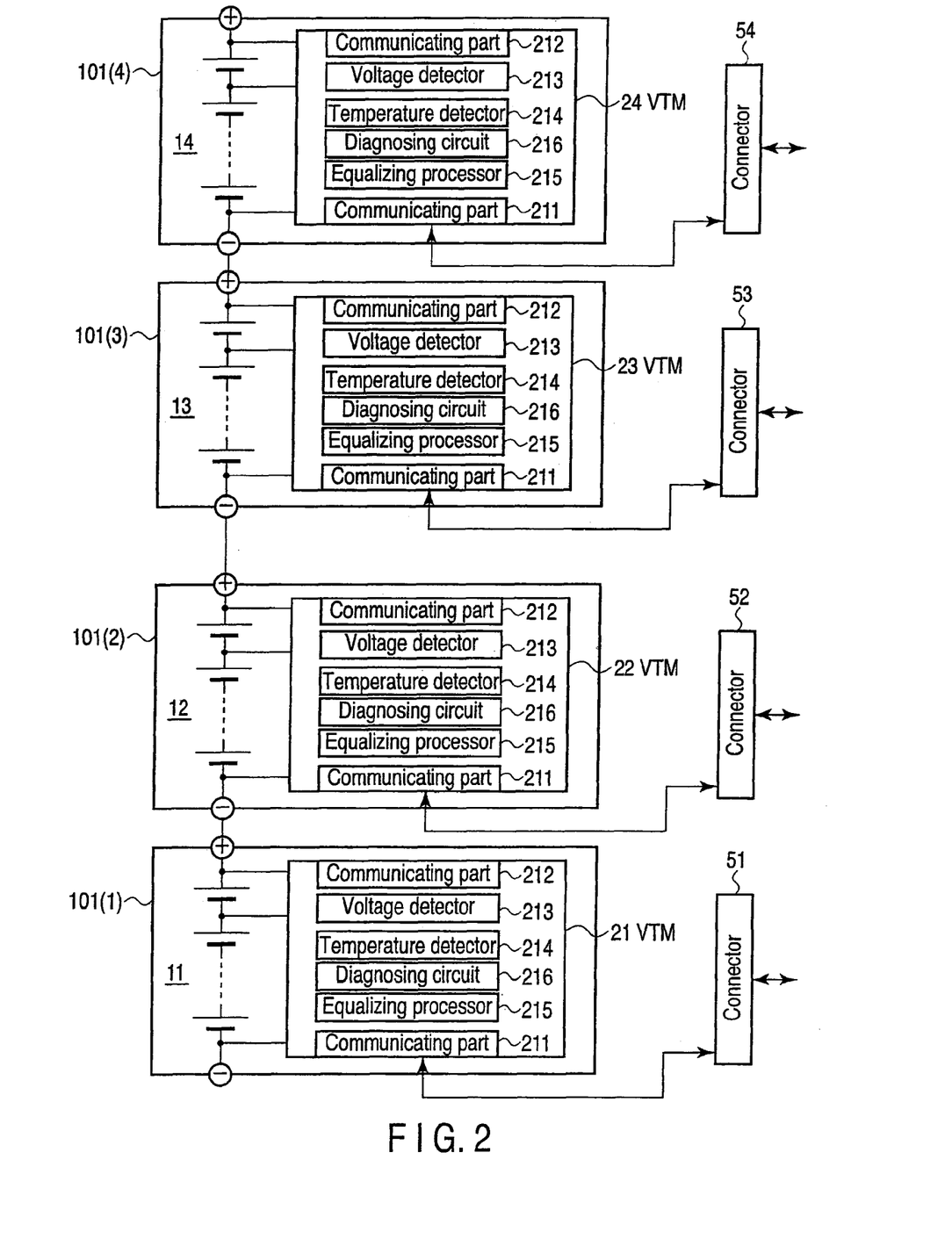
FIG. 2 is a diagram for explaining a structure example of an assembled battery monitoring circuit of the secondary battery device according to the embodiment of the present invention.

FIG. 2 shows the functional blocks of assembled battery monitoring circuits (VTM: Voltage Temperature Monitoring) 21 to 24 in detail. As shown in FIGS. 1 and 2, the assembled battery modules 101(1), 101(2), 101(3) and 101(4) have the assembled batteries 11, 12, 13, 14 and the assembled battery monitoring circuits 21, 22, 23, 24, respectively.

The communicating parts 211 at the lower side of the assembled battery monitoring circuits 21 to 24 are connected to the battery management unit 60 via the connectors 51 to 54, respectively. In the present embodiment, the assembled battery monitoring circuits 21 to 24 are arranged near the assembled batteries 11 to 14, respectively, so that information on the assembled batteries 11 to 14 is acquired, thereby enhancing an accuracy of monitoring.

There may be configured such that the communicating parts 211 and 212 are connected in series between the assembled battery monitoring circuits 21 and 22 and the communicating parts 211 and 212 are connected in series between the assembled battery monitoring circuits 23 and 24 so that the communicating parts 211 at the lower side of the assembled battery monitoring circuits 21 and 23 are connected to the battery management unit 60 via connectors. In this case, the assembled battery monitoring circuits 21 and 22 are connected to each other via the mutual communicating parts 211 and 212 so that bidirectional communication can be made, and the assembled battery monitoring circuits 23 and 24 are also connected to each other via the mutual communicating parts 211 and 212 so that bidirectional communication can be made.

When the assembled battery monitoring circuits 21 and 22 are connected in series, an information input/output terminal of the lower side communicating part 211 of the assembled battery monitoring circuit 21 is connected to the battery management unit 60 via the connector. An information input/output terminal of the higher side communicating part 212 of the assembled battery monitoring circuit 21 is connected to an information input/output terminal at the lower side of the assembled battery monitoring circuit 22.

When the assembled battery monitoring circuits 23 and 24 are connected in series, an information input/output terminal of the lower side communicating part 211 of the assembled battery monitoring circuit 23 is connected to the battery management unit 60 via the connector. An information input/output terminal at the higher side of the assembled battery monitoring circuit 23 is connected to an information input/output terminal at the lower side of the assembled battery monitoring circuit 24.

The functional blocks of the assembled battery monitoring circuits 21 to 24 are the same and thus the functional block of the assembled battery monitoring circuit 21 will be explained as a representative example. The assembled battery monitoring circuit 21 includes the lower side communicating part 211 connected to the connector 51. The assembled battery monitoring circuit 21 includes the higher side communicating part 212 used for connecting with other assembled battery monitoring circuit in series.

The assembled battery monitoring circuit 21 includes a voltage detector 213, a temperature detector 214, an equalizing processor 215 configured to equalize voltages of the battery cells, and a diagnosing circuit 216 configured to output a pulsation signal based on a basic frequency.

The voltage detector 213 detects voltages between the terminals of the respective secondary battery cells 11(1) to 11(x) of the assembled battery 11 (hereinafter, which will be called secondary battery cell voltage). The detected secondary battery cell voltage is transferred to the battery management unit 60 via the communicating part 211. The temperature detector 214 detects temperatures of the respective secondary battery cells 11(1) to 11(x) or near the plurality of secondary battery cells. The detected temperature data is transferred to the battery management unit 60 via the communicating part 211.

The battery management unit 60 monitors an abnormal state due to overcharge or overdischarge of the plurality of secondary battery cells based on the secondary battery cell voltage supplied from the voltage detector 213 or the temperature value around the plurality of secondary battery cells supplied from the temperature detector 214.

There is known that in the secondary battery device, energies between the combined secondary battery cells are not uniform due to variations of charging, discharging or temperature of the secondary battery cells. The energies between the secondary battery cells are not uniform and thereby charging/discharging cannot be efficiently performed so as to exploit the function of the secondary battery device.

When charging is performed without the equalizing processing while a secondary battery cell having a large remaining amount is present, the secondary battery cell having the large remaining amount rapidly reaches a full-charged state before a secondary battery cell having a small remaining amount does not reach the full-charged state, and thus the entire charging is completed. Therefore, it is necessary to perform the equalizing processing on the energies between the secondary battery cells by the equalizing processor 215 during charging.

A sequencer or controller is provided in each of the assembled battery monitoring circuits 21 to 24 and collectively controls the operation timings of data exchange and switches.

Figure 3:
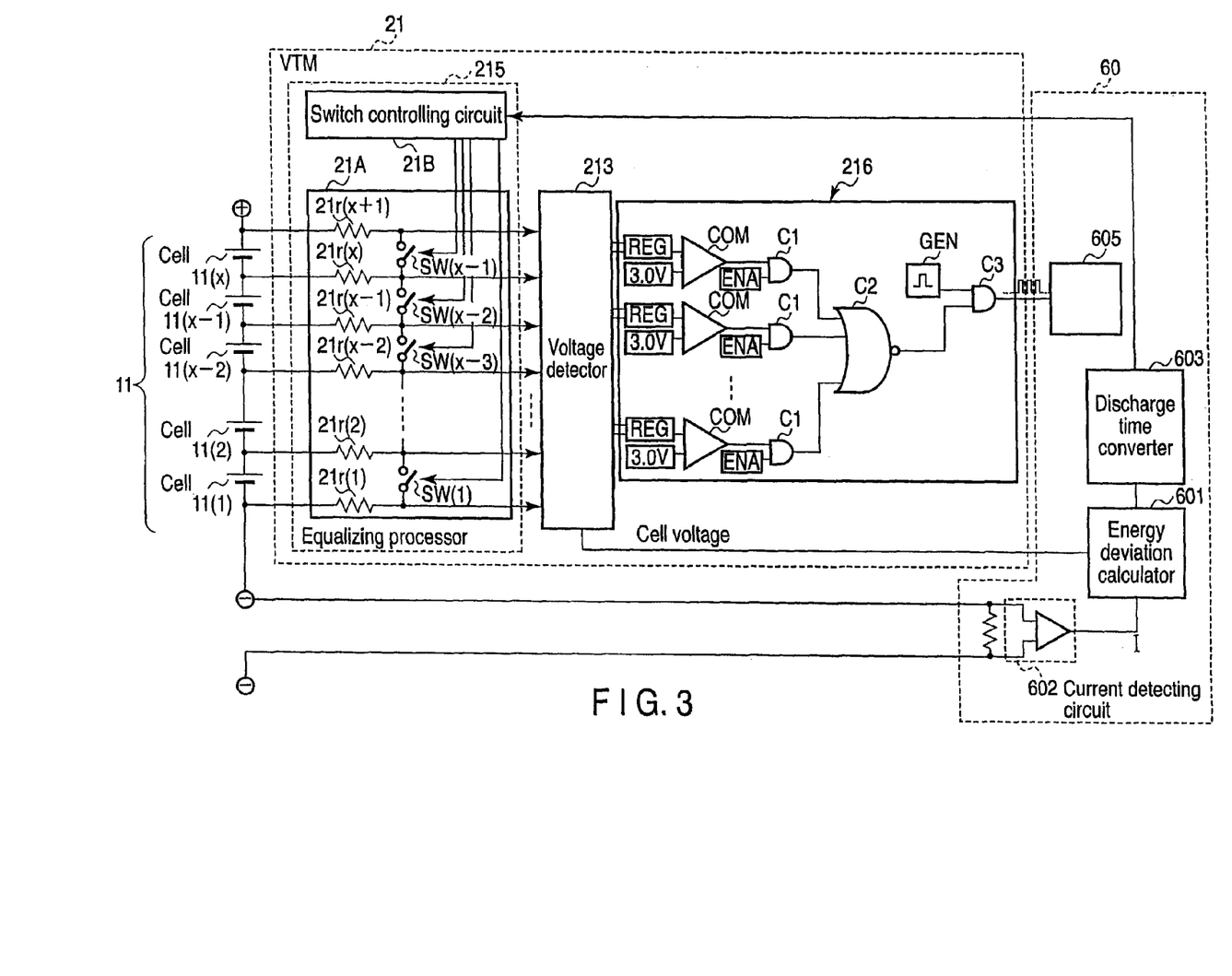
FIG. 3 is a diagram for explaining a structure example of a diagnosing circuit of the assembled battery monitoring circuit of the secondary battery device according to the embodiment of the present invention.

FIG. 3 shows a schematic structure example of the voltage detector 213, the equalizing processor 215 and the diagnosing circuit 216 in the assembled battery monitoring circuit 21. The plurality of secondary battery cells 11(1) to 11(x) connected in series configure the assembled battery 11. A positive terminal and a negative terminal of each of the secondary battery cells 11(1) to 11(x) are connected to the voltage detector 213. The voltage detector 213 individually measures the secondary battery cell voltages of the respective secondary battery cells.

A temperature sensor (not shown) is arranged near each of the secondary battery cells 11(1) to 11(x). The respective output terminals of the plurality of temperature sensors are connected to the temperature detectors 214. The temperature detector 214 converts each temperature sensor output into data and outputs the data to the communicating part 211.

The negative terminal and the positive terminal of each of the plurality of secondary battery cells are connected to the voltage detector 213 via each of discharge resistors $21r(1)$ to $21r(x+1)$. The terminals of the discharge resistor $21r(1)$ and the discharge resistor $21r(2)$ are connected to the negative terminal and the positive terminal of the secondary battery cell 11(1), respectively, and the other terminals are connected to each other via the discharge switch SW(1).

The terminals of the discharge resistor $21r(2)$ and the discharge resistor $21r(3)$ are connected to the negative terminal and the positive terminal of the secondary battery cell 11(2) and the other terminals are connected to each other via the discharge switch SW(2). Similarly, two sets of discharge resistors are connected to the negative terminal and the positive terminal of the corresponding secondary battery cell and the other terminals thereof are connected to each other via the corresponding discharge switch.

The discharge resistors $21r(1)$ to $21r(x+1)$ and the discharge switches SW(1) to SW(x+1) are contained in an equalizing circuit 21A. The discharge switches SW(1) to SW(x+1) are turned on and off by a switch controlling circuit 21B.

The voltage detector 213 detects the secondary battery cell voltages of the respective secondary battery cells 11(1) to 11(x). Each detected secondary battery cell voltage is fetched in an energy deviation calculator 601 of the battery management unit 60 via the communicating part 211. A current flowing through the assembled battery 11 is also detected by a current detecting circuit 602 and is fetched in the energy deviation calculator 601.

A voltage is first supplied between the positive terminal and the negative terminal of the assembled battery 11 in order to detect an energy deviation between the secondary battery cells, that is, nonuniformity of the secondary battery cell voltages. When an energy deviation is present between the plurality of secondary battery cells, a difference occurs between the reach times until each secondary battery cell voltage reaches a predefined specific voltage.

Three secondary battery cells (not shown) connected in series are assumed for simplicity and it is assumed that a time difference occurs until the secondary battery cells AX, BX and CX reach a specific voltage, respectively. Then, it is assumed that the secondary battery cell AX reaches the specific voltage fastest. The reach time at this time is assumed to be 0 second as a reference time to.

The reach times when the secondary battery cells BX and CX reach the specific voltage, respectively, are assumed as t1 and t2 with respect to the reference time t0. A capacity difference (mAh) between the secondary battery cell AX and the secondary battery cell BX and a capacity difference (mAh) between the secondary battery cell AX and the secondary battery cell CX are calculated based on the reach times t1, t2 and the value of the current flowing through the assembled battery 11.

Further, how much each secondary battery cell BX, CX has to be discharged in order to cause each secondary battery cell BX, CX to have the same remaining capacity (SOC: State Of Charge) as the secondary battery cell AX is calculated from the calculated capacity difference. The calculation is conducted in a discharge time converter 603 and thus discharge time data of each secondary battery cell is obtained.

The discharge time data of each secondary battery cell is input into the switch controlling circuit 21B within the equalizing processor 215. The switch controlling circuit 21B turns on or off the discharge switches SW(1) to SW(x+1) within the equalizing circuit 21A.

The discharge switch corresponding to the secondary battery cell to be discharged is turned on and the discharging of the secondary battery cell, that is, energy discharging is performed. Thus, energy equalizing is performed between the high-energy secondary battery cell and the low-energy secondary battery cell.

The positive terminal voltages and the negative terminal voltages of the secondary battery cells 11(1) to 11(x) are supplied also to the diagnosing circuit 216. The diagnosing circuit 216 comprises resisters REG into which the positive terminal voltages and the negative terminal voltages of the respective secondary battery cells 11(1) to 11(x) are input, and comparators COM to which an output of the register REG is supplied. The comparator COM compares a threshold voltage value (such as 3.0V) set by the resister with a secondary battery cell voltage output from the register REG, and when the secondary battery cell voltage is larger than the threshold voltage value, outputs a high level signal. The output signal from the comparator COM is supplied to an AND circuit C1.

The AND circuit C1 is supplied with the output signal from the comparator COM and an output signal (enable bit) from an enable register ENA. The enable register ENA sets a first level signal output from the comparator COM at the high level when the first level signal is output from the AND circuit C1 and sets a low level (second level) signal at the low level when the low level signal is output from the AND circuit C1 irrespective of the signal output from the comparator COM. The output signal (enable bit) of the enable register ENA is typically set at the high level.

The AND circuit C1 outputs a high level signal when the output signal from the comparator COM is at the high level. In other words, the AND circuit C1 outputs the high level signal when the secondary battery cell voltage is larger than the threshold voltage.

The output signal from the AND circuit C1 is supplied to a NOR circuit C2. The NOR circuit C2 outputs a low level signal when any of the output signals from the plurality of AND circuits C1 is at the high level. In other words, when any of the secondary battery cell voltages is larger than the threshold voltage, the NOR circuit C2 outputs a low level signal. The NOR circuit C2 outputs a high level signal when all the output signals from the plurality of AND circuits C1 are at the low level, that is, when all the secondary battery cell voltages are equal to or smaller than the threshold voltage.

The output signal from the NOR circuit C2 is supplied to an AND circuit C3. The AND circuit C3 is supplied with the output signal from the NOR circuit C2 and a pulsation signal which is generated in a pulse generating circuit GEN and is periodically switched between ON and OFF. The AND circuit C3 outputs a pulsation signal when the output signal from the NOR circuit C2 is at the high level, and outputs a low level signal when the output signal from the NOR circuit C2 is at the low level.

In other words, the AND circuit C3 outputs a low level signal when any of the secondary battery cell voltages of the secondary battery cells $11(1)$ to $11(x)$ is larger than the threshold voltage value, and outputs a pulsation signal when all the secondary battery cell voltages are equal to or smaller than the threshold voltage value. The output signals from the AND circuit C3 are supplied as the overvoltage alarm signals alarm1# to alarm4# output from the diagnosing circuit 216 to the battery management unit 60 via the communicating part 211 and the connector 51.

The diagnosing circuit 216 shown in FIG. 3 is configured to output the pulsation signals or the low level signals as the overvoltage alarm signals alarm1# to alarm4#, but may output the output signals from the NOR circuit C2 as the overvoltage alarm signals alarm1# to alarm4# from the diagnosing circuit 216. At this time, when any of the secondary battery cell voltages is larger than the threshold voltage, the overvoltage alarm signal is the low level signal.

When a pulsation signal is supplied from the assembled battery monitoring circuits 21 to 24 to the battery management unit 60, the battery management unit 60 can erroneously judge whether the signal is the pulsation signal due to a noise influence on a path in which the pulsation signal is transmitted from the assembled battery monitoring circuits 21 to 24 to the battery management unit 60. To the contrary, when the high level or low level signal is output as the output signal of the diagnosing circuit 216, the battery management unit 60 is less likely to erroneously judge the signal level.

As described above, in the secondary battery device according to the present embodiment, the battery management unit 60 monitors the abnormal states of the plurality of secondary battery cells based on the voltage value supplied from the voltage detector 213 and the temperature value supplied from the temperature detector 214, and monitors whether the plurality of secondary battery cells are in the overvoltage state in the battery management unit based on the diagnosis result in the diagnosing circuit 216.

In this way, whether the plurality of secondary battery cells are in an abnormal state is monitored by a plurality of different systems so that even when an abnormal state is not detected due to a communication module's failure in either one system, the other system can detect the abnormal state. Thus, whether the plurality of secondary battery cells are in the abnormal state is monitored by the plurality of different systems, and thus the safety of the secondary battery device and the vehicle can be enhanced.

Figure 4:
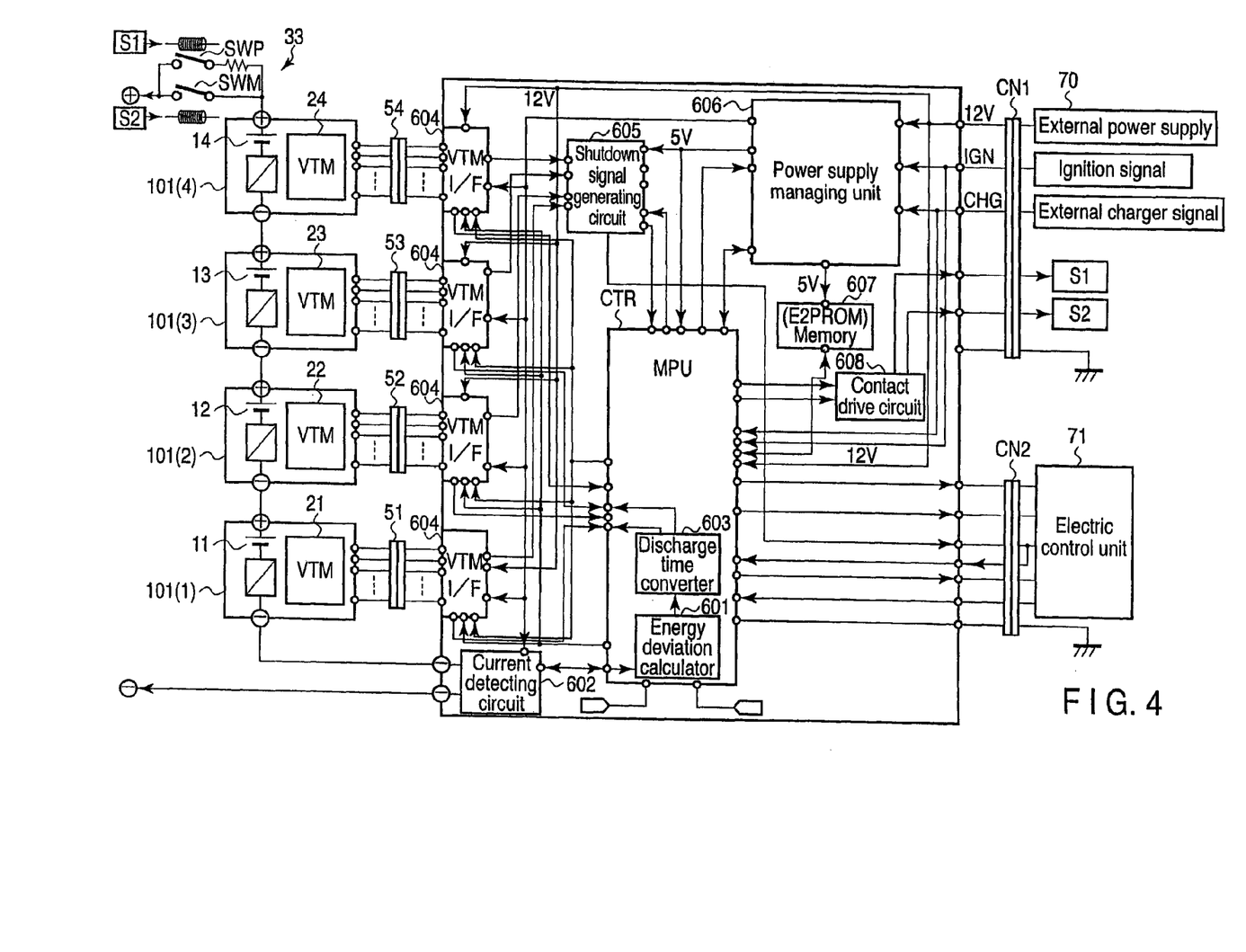
FIG. 4 is a diagram for explaining a structure example of a battery management unit of the secondary battery device according to the embodiment of the present invention.

FIG. 4 shows the entire blocks of the battery management unit 60 for explanation. As shown in FIG. 4, the battery management unit 60 comprises a current detecting circuit 602, interface circuits 604 connected to the communicating parts 211 of the assembled battery monitoring circuits 21 to 24 via the connectors 51 to 54, a shutdown signal generating circuit 605 configured to be supplied with the output signals of the diagnosing circuits 216 of the assembled battery monitoring circuits 21 to 24 and to output a shutdown signal, a power supply managing unit 606 configured to be supplied with a power supply voltage from the external power supply 70, a contact drive circuit 608, a memory 607, and a controlling circuit (MPU) CTR configured to control the operations of the secondary battery device.

The memory 607 is EEPROM (Electronically Erasable and Programmable Read Only Memory), for example. The memory 607 records programs defining the operations of the controlling circuit CTR therein. The energy deviation calculator 601 and the discharge time converter 603 shown in FIG. 4 are contained in the controlling circuit CTR.

The battery management unit 60 is supplied with a power supply voltage, an ignition signal IGN and an external charger signal CHG via a connector CN1 from the external power supply 70, an ignition (not shown) and an external charger (not shown). The battery management unit 60 transmits and receives a signal to and from the electric control unit 71 via a connector CN2.

The interface circuits 604 are supplied with the data such as secondary battery cell's voltage value or assembled battery's temperature value, a pulsation signal output from the diagnosing circuit 216 and a communication power supply voltage signal from the assembled battery monitoring circuits 21 to 24 via the connectors 51 to 54. The interface circuits 604 supply a clock signal, a data signal and a shutdown signal (SHDN) to the assembled battery monitoring circuits 21 to 24 via the connectors 51 to 54.

The interface circuit 604 supplies the data such as secondary battery cell's voltage value and assembled battery's temperature value to the controlling circuit CTR via the bidirectional serial communication and supplies the voltage diagnosing signal output from the diagnosing circuit 216 to the shutdown signal generating circuit 605.

The shutdown signal generating circuit 605 comprises a watchdog timer (WDT) therein, and judges whether an overvoltage alarm signal supplied from the diagnosing circuit 216 of the interface circuit 604 and a WDT access signal wdt_feed supplied from the controlling circuit CTR are normal or abnormal.

When the voltage of the secondary battery cell is normal from the overvoltage alarm signals alarm1# to alarm4# supplied from the diagnosing circuit 216, the shutdown signal generating circuit 605 outputs a high level shutdown signal shutdown#. When it is judged that the voltage of the secondary battery cell is abnormal from the overvoltage alarm signals alarm1# to alarm4# output from the diagnosing circuits 216, the shutdown signal generating circuit 605 outputs a low level shutdown signal shutdown# having a certain pulse width or more.

After being inverted, the shutdown signal shutdown# output from the shutdown signal generating circuit 605 is supplied to the electric control unit 71 connected via the connector CN2. Further, the shutdown signal shutdown passing through the connector CN2 is supplied to the controlling circuit CTR via the connector CN2 again.

When the self-diagnosis is made in the secondary battery device, the shutdown signal generating circuit 605 judges whether the operation of the diagnosing circuit 216 is abnormal based on the output signal from the diagnosing circuit 216, and outputs a confirmation overvoltage alarm signal alarm to the controlling circuit CTR. The self-diagnosing operation in the secondary battery device will be described below in detail.

The contact drive circuit 608 outputs a signal S1 for controlling the operation of the precharge switch SWP of the switch device 33 and a signal S2 for controlling the operation of the main switch SWM under control of the controlling circuit CTR.

The signals S1 and S2 are supplied to the switch device 33 via the connector CN1. The precharge switch SWP and the main switch SWM are turned on or off by the signals S1 and S2 supplied to the nearby-arranged coil.

For example, when the operation of the diagnosing circuit 216 is abnormal, the controlling circuit CTR can judge that the reliability of the diagnosing circuit 216 is reduced from the supplied confirmation overvoltage alarm signal, and can control the contact drive circuit 608 to turn off the precharge switch SWP and the main switch SWM.

When the precharge switch SWP and the main switch SWM have to be turned off by the electric control unit 71, if the charging or discharging is not released due to a failure of the electric control unit 71, the controlling circuit CTR controls the contact drive circuit 608 to turn off the precharge switch SWP and the main switch SWM.

The power supply managing unit 606 supplies a power supply voltage to the current detecting circuit 602, the interface circuits 604, the shutdown signal generating circuit 605, the memory 607 and the controlling circuit CRT. The power supply managing unit 606 comprises a changeover circuit (not shown) configured to turn on or off the power voltage supplying to the controlling circuit CTR, and a timer (not shown).

The power supply voltage having 12V output from the external power supply 70 is converted into a DC voltage having 5V by a DC/DC circuit arranged in front of the timer, and is supplied to the timer of the power supply managing unit 606. The changeover circuit is supplied with a changeover control signal from the control signal, the external charger signal CHG, the ignition signal IGN, a wakeup signal from the timer, and a power supply voltage from the external power supply 70. The wakeup signal from the timer to the changeover circuit is turned on (=1) every set time. A timing when the wakeup signal is turned on is set by the controlling circuit CTR.

The ignition signal IGN is turned on (to be equal to or more than a predetermined voltage) when a key is inserted into the ignition, and is turned off (to be less than the predetermined voltage) when the key is removed. The external charger signal CHG is turned on (to be equal to or more than a predetermined voltage) when the external charger is connected to the secondary battery device, and is turned off (to be less than the predetermined voltage) when the connection is released. The wakeup signal, the ignition signal IGN and the external charger signal CHG are supplied also to the controlling circuit CTR.

When the secondary battery device is mounted on a device other than vehicle, the ignition signal is turned on when the device mounting the secondary battery device thereon is subjected to power-on operation, and is turned off when it is subjected to power-off operation.

When at least one of the ignition signal IGN, the external charger signal CHG and the wakeup signal is turned on, the changeover circuit converts the power supply voltage supplied from the external power supply 70 into a DC voltage having 5V by the DC/DC circuit, and supplies the DC voltage to the shutdown signal generating circuit 605 and the controlling circuit CTR.

When at least one of the ignition signal IGN, the external charger signal CHG and the wakeup signal is turned on, the changeover circuit converts the power supply voltage supplied from the external power supply 70 into a DC voltage having a certain magnitude by the internal DC/DC circuit, and supplies the DC voltage to the interface circuit 604 and the current detecting circuit 602.

When any of the ignition signal IGN, the external charger signal CHG and the wakeup signal is turned on and the changeover circuit is turned on so that power supplying is started, the controlling circuit CTR confirms whether the power supply voltage is supplied depending on which signal is turned on.

The controlling circuit CTR is supplied with the wakeup signal from the timer of the power supply managing unit 606, and is supplied with the ignition signal IGN and the external charger signal CHG via the connector CN1. Thus, the controlling circuit CTR can confirm by which signal the changeover circuit is turned on. When being able to confirm by which signal the power supply voltage is supplied, the controlling circuit CTR turns on the changeover control signal and maintain the state in which the power supply voltage is being supplied.

The controlling circuit CTR monitors the wakeup signal, the ignition signal IGN and the external charger signal CHG to turn off the changeover control signal and the changeover circuit when all the signals are turned off. Thus, the power supply voltage stops being supplied to the controlling circuit CTR, the shutdown signal generating circuit 605, the interface circuit 604 and the current detecting circuit 602.

The controlling circuit CTR supplies, to the interface circuits 604, logic signals for continuing the operations of the assembled battery monitoring circuits 21 to 24 even when the power supplying to the controlling circuit CTR is stopped. The assembled battery monitoring circuits 21 to 24 are configured to independently operate by the logic signals also while the power supplying to the controlling circuit CTR is being stopped. The controlling circuit CTR is configured to supply the signals for shutting down the assembled battery monitoring circuits 21 to 24 when the voltage supplied from the external power supply 70 to the battery management unit 60 is equal to or less than a certain value.

Figure 5A:
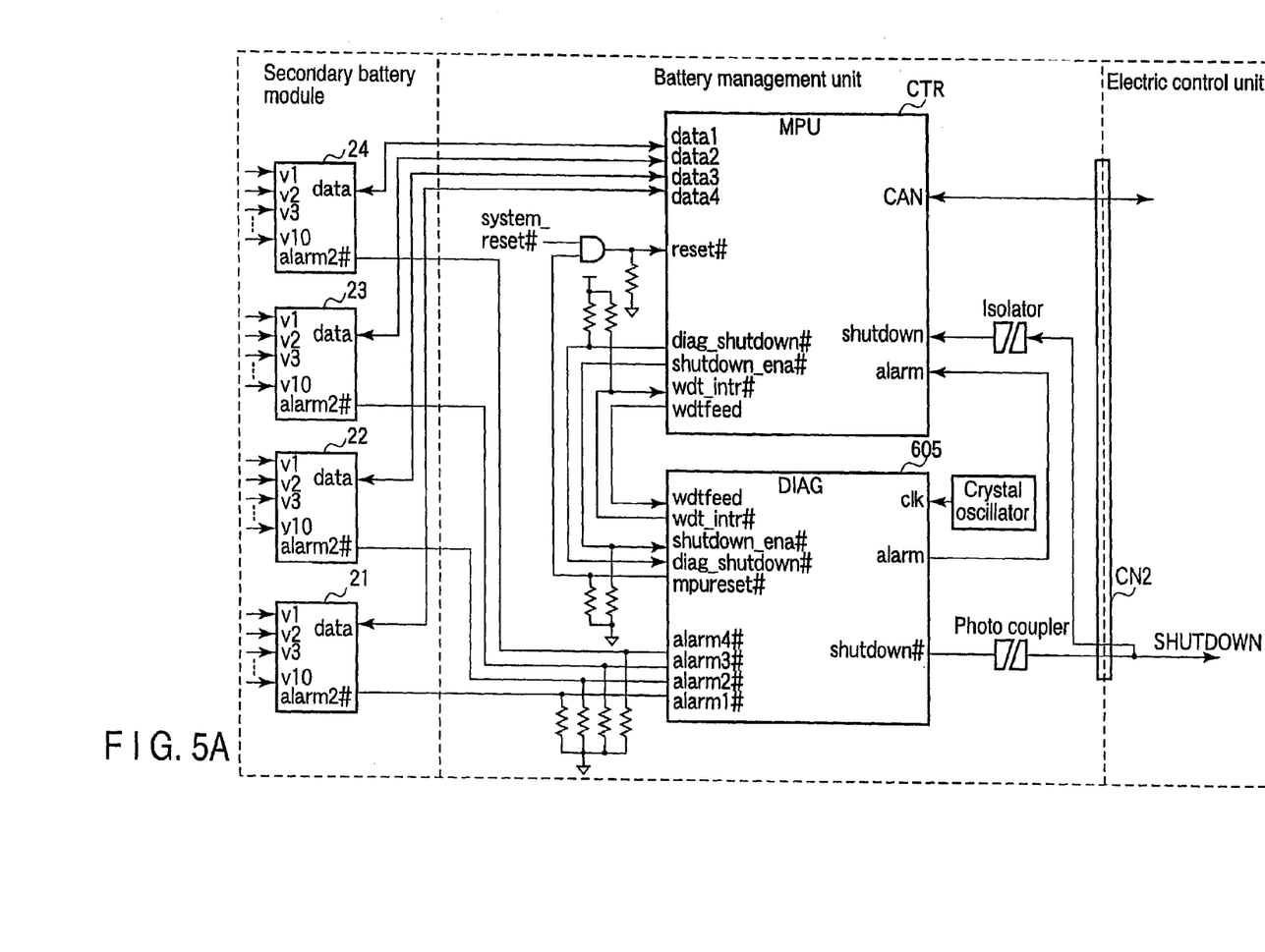
FIG. 5A is a diagram for explaining an example of a signal transmitted and received between a controlling circuit and a shutdown signal generating circuit in the battery management unit shown in FIG. 4 and an electric control unit.

FIG. 5A shows exemplary blocks of the controlling circuit CTR and the shutdown signal generating circuit 605. In the secondary battery device according to the present embodiment, the shutdown signal generating circuit 605 is realized by a small-sized PLD (Programmable Logic Device) having a small failure rate. The controlling circuit CTR is supplied with the data such as secondary battery cell's voltage or temperature value from the assembled battery monitoring circuits 21 to 24. The controlling circuit CTR uses CAN (Controller Area Network), for example, to transmit and receive a signal to and from the electric control unit 71.

Figure 5B:
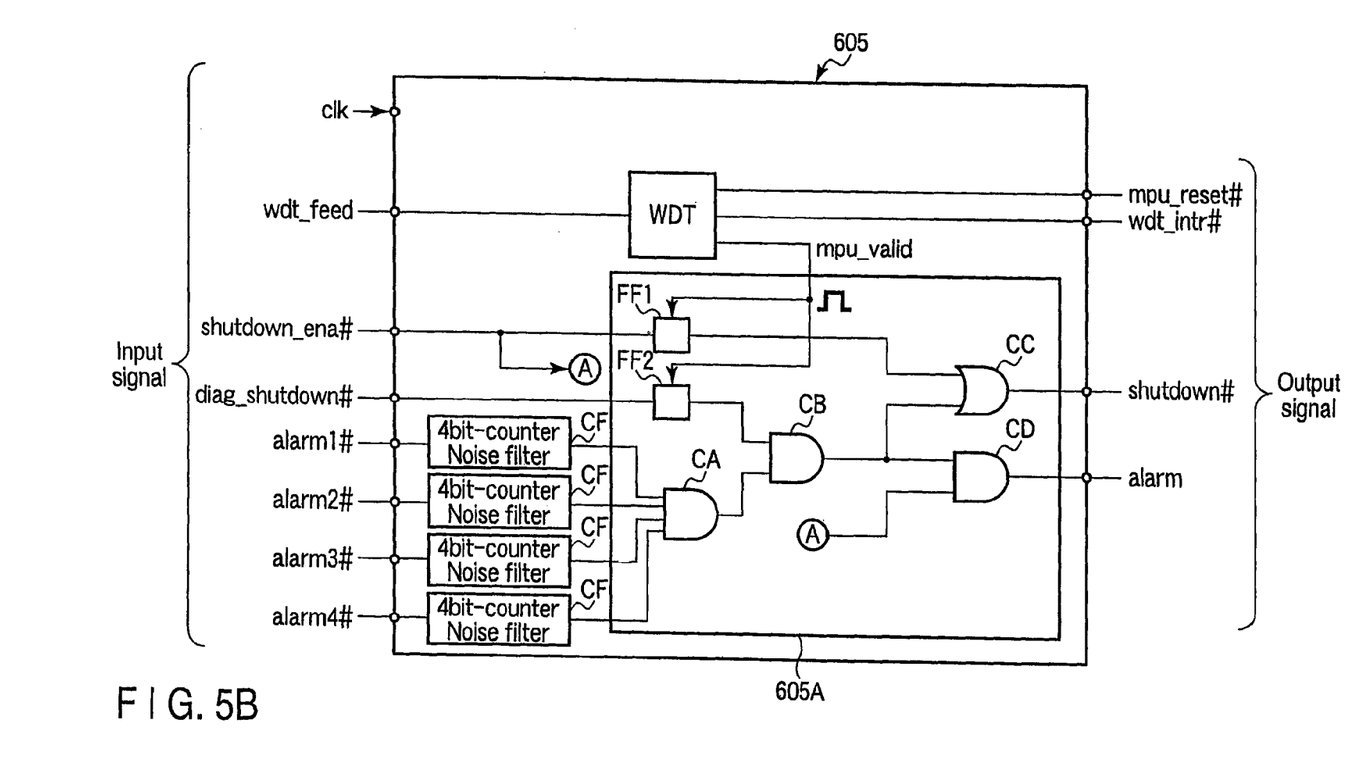
FIG. 5B is a diagram for explaining a structure example of the shutdown signal generating circuit shown in FIG. 5A.

FIG. 5B shows exemplary blocks of the shutdown signal generating circuit 605. As shown in FIG. 5B, the shutdown signal generating circuit 605 comprises the watchdog timer WDT configured to diagnose the controlling circuit CTR, noise filters CF as noise removing module for the output signals (overvoltage alarm signals alarm1# to alarm4#) of the diagnosing circuits 216 supplied from the interface circuits 604, and a signal generating module 605A configured to generate a shutdown signal shutdown# for turning off the main switch SWM and the precharge switch SWP.

In the structure of the shutdown signal generating circuit 605 shown in FIG. 5B, it is assumed that a high level signal or low level signal as output signal of the NOR circuit C2 is supplied as the overvoltage alarm signal alarm1# to alarm4# supplied from the diagnosing circuit 216.

The shutdown signal generating circuit 605 comprises eight input pins and four output pins. The shutdown signal generating circuit 605 is input a clock signal clk generated by a crystal oscillator, a signal Wdt_feed supplied from the controlling circuit CTR to the watchdog timer WDT, an enable signal shutdown_ena# and a diagnosis signal diag_shutdown# supplied from the controlling circuit CTR for diagnosis, and the overvoltage alarm signals alarm1# to alarm4# supplied from the respective four diagnosing circuits 216.

The shutdown signal generating circuit 605 outputs a reset signal mpu_reset# supplied to the controlling circuit CTR, an interruption request signal wdt_intr# from the watchdog timer WDT to the controlling circuit CTR, a shutdown signal shutdown#, and a confirmation overvoltage alarm signal alarm to the controlling circuit CTR.

The signal generating module 605A comprises a first AND circuit CA to which the overvoltage alarm signals alarm1# to alarm4# are supplied via noise filters CF, a first flip-flop circuit FF1 to which the enable signal shutdown_ena# is supplied, a second flip-flop circuit FF2 to which the diagnosis signal diag_shutdown# is supplied, a second AND circuit CB to which the output signal of the first AND circuit CA and the output signal of the second flip-flop circuit FF2 are supplied, a first OR circuit CC to which the output signal of the first flip-flop circuit FF1 and the output signal of the second AND circuit CB are supplied, and a third AND circuit CD to which the output signal of the second AND circuit and the enable signal shutdown_ena# are supplied.

As shown in FIG. 5B, the output signal of the first OR circuit CC is output as the shutdown signal shutdown# to the electric control unit 71, and the output signal of the third AND circuit CD is output as the confirmation overvoltage alarm signal alarm to the controlling circuit CTR.

The shutdown signal shutdown# is inverted after being output from the shutdown signal generating circuit 605, and is output to the electric control unit 71 via a photo coupler and the connector CN2 as insulating communication modules. The inverted shutdown signal shutdown is output to the electric control unit 71 via the connector CN2 and then is supplied to the controlling circuit CTR via the connector CN2 and an isolator. Since the battery management unit 60 and the electric control unit 71 are different from each other in earth potential, they transmit and receive a signal via the photo coupler or the isolator as insulating modules.

The shutdown signal shutdown# is directed for notifying the electric control unit 71 of whether an overvoltage due to the overcharging of the secondary battery cell occurs. The electric control unit 71 is supplied with the inverted shutdown signal shutdown, judges that an abnormal state such as overvoltage occurs when a high level shutdown signal shutdown having a certain pulse width or more is supplied to the electric control unit 71, and performs the shutdown processing.

The overvoltage alarm signals alarm1# to alarm4# indicate whether the overvoltage state of the secondary battery cell is present or absent from the diagnosing circuits 216 of the assembled battery monitoring circuits 21 to 24 to the shutdown signal generating circuit 605. In the present embodiment, the high level overvoltage alarm signals alarm1# to alarm4# indicate the absence of the overvoltage, and the low level overvoltage alarm signals alarm1# to alarm4# indicate the presence of the overvoltage. The overvoltage alarm signals alarm1# to alarm4# are supplied to the signal generating module 605A via the noise filters CF as noise removing module.

The diagnosis signal diag_shutdown# is directed for diagnosing the activation of the shutdown signal shutdown# between the shutdown signal generating circuit 605 and the electric control unit 71. When the diagnosis signal diag_shutdown# is at the low level and the enable signal shutdown_ena# is at the low level, the shutdown signal shutdown# is at the low level. The diagnosis signal diag_shutdown# is at the low level also when the controlling circuit CTR needs to make a shutdown notification to the electric control unit 71 for emergency.

For example, in order to prevent an erroneous instruction signal from being supplied to the electric control unit 71 due to a failure of the controlling circuit CTR, the shutdown signal generating circuit 605 receives an emergency shutdown instruction for the electric control unit 71 by the diagnosis signal diag_shutdown# after the watchdog timer WDT confirms the soundness of the controlling circuit CTR. In other words, when the diagnosis signal diag_shutdown# is at the low level, the output signal of the second flip-flop circuit FF2 is set by a pulse of a confirmation signal mpu_valid from the watchdog timer WDT which is output after the soundness of the controlling circuit CTR is confirmed by a WDT access signal wdt_feed. When the diagnosis signal diag_shutdown# is at the high level, the output signal is always received irrespective of whether the soundness of the controlling circuit CTR is confirmed.

The enable signal shutdown_ena# is directed for permitting to output the shutdown signal shutdown# to the electric control unit 71. The controlling circuit CTR drives the enable signal shutdown_ena# at the low level when diagnosing the shutdown signal shutdown# by the diagnosis signal diag_shutdown# or charging the secondary battery cell. In other words, when the enable signal shutdown_ena# is at the low level, the shutdown signal shutdown# is permitted to output, and when the enable signal shutdown_ena# is at the high level, the output of the shutdown signal shutdown# is being blocked (masked).

The enable signal shutdown_ena# is driven at the high level while the self-diagnosis is made on the assembled battery monitoring circuits 21 to 24 so that a pulse of the shutdown signal shutdown# for notifying the overvoltage of the secondary battery cell set for the diagnosis in a pseudo manner is prevented from being output to the electric control unit 71.

In order to prevent the enable signal shutdown_ena# from being erroneously driven at the high level due to a failure of the controlling circuit CTR, the high level enable signal shutdown_ena# is received after the watchdog timer WDT confirms the soundness of the controlling circuit CTR. In other words, when the enable signal shutdown_ena# is at the high level, the output signal of the first flip-flop circuit FF1 is set by the pulse of the confirmation signal mpu_valid from the watchdog timer WDT which is output after the soundness of the controlling circuit CTR is confirmed by the WDT access signal wdt_feed. The low level enable signal shutdown_ena# is always received irrespective of whether the soundness of the controlling circuit CTR is confirmed.

The WDT access signal wdt_feed is supplied from the controlling circuit CTR to the shutdown signal generating circuit 605 and is periodically turned on and off at a constant pulse width. When the access from the controlling circuit CTR is normal, the reset signal mpu_reset# due to the overflow of the watchdog timer WDT is blocked (masked). The reset signal mpu_reset# is directed for resetting the controlling circuit CTR when the watchdog timer WDT detects an abnormality of the controlling circuit CTR.

The interruption request signal wdt_intr# is indicative of a watchdog timer WDT's interruption request for the controlling circuit CTR. When the watchdog timer WDT overflows, the interruption request signal wdt_intr# is driven at the high level.

When receiving the interruption request signal wdt_intr#, the controlling circuit CTR drives the WDT access signal wdt_feed at the high level within a certain period of time. In other words, driving the interruption request signal wdt_intr at the high level also serves as diagnosing whether the watchdog timer WDT overflows.

Figure 6A:
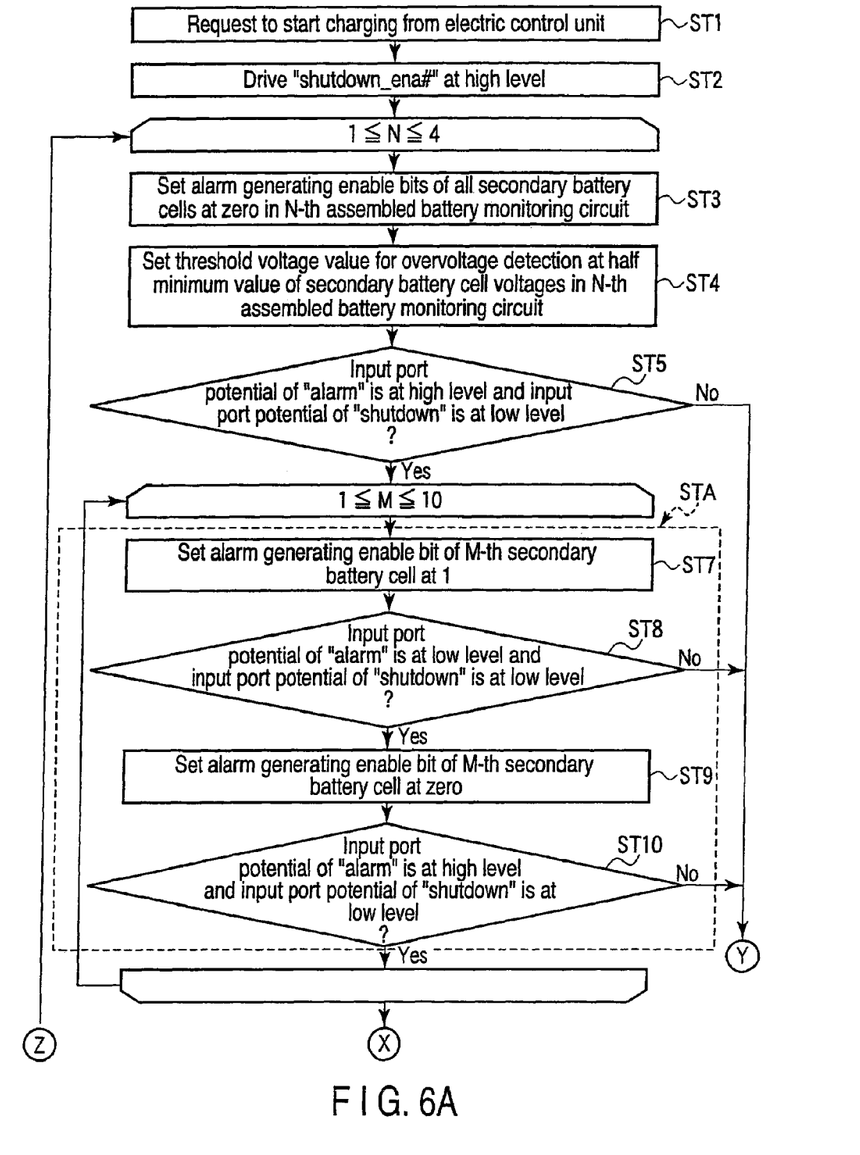
FIG. 6A is a flowchart for explaining an example of an operation of the controlling circuit shown in FIGS. 4 and 5A.
Figure 6B:
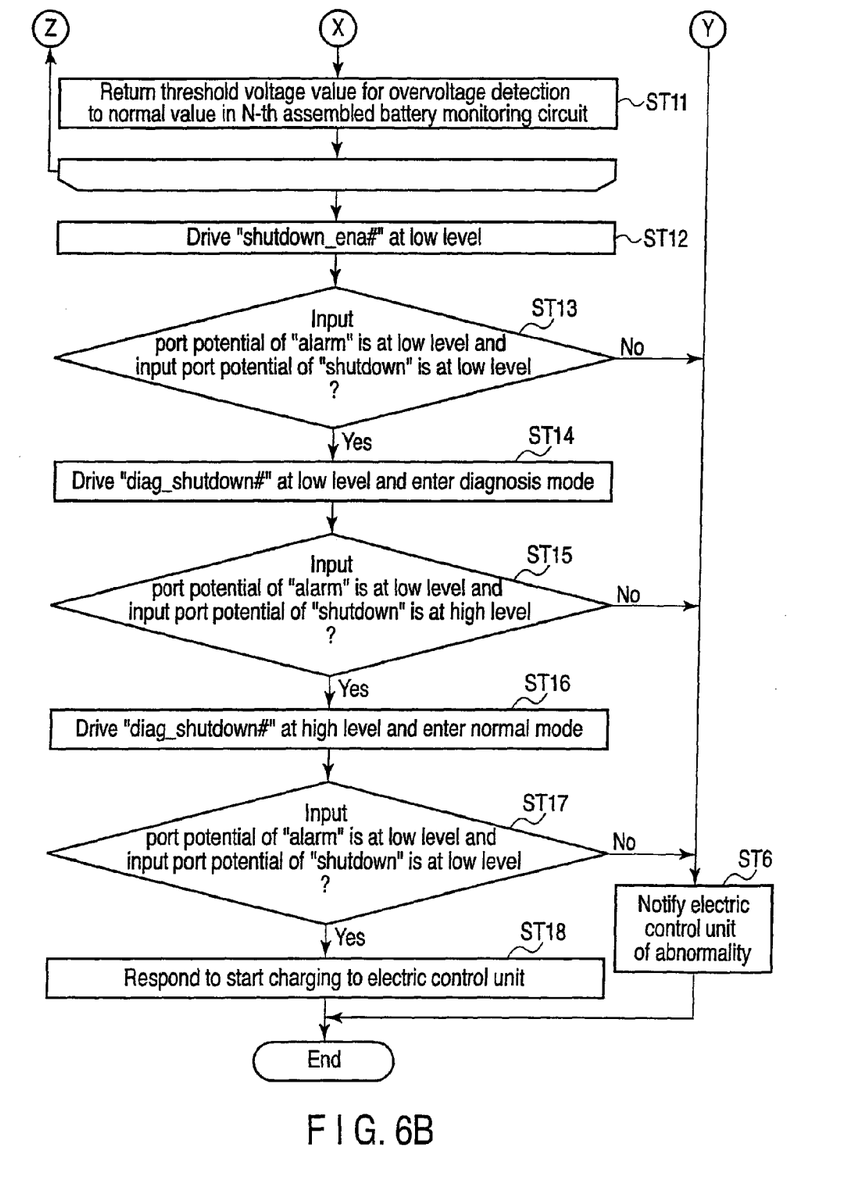
FIG. 6B is a flowchart for explaining an example of an operation of the controlling circuit shown in FIGS. 4 and 5A.

The operations of the self-diagnosis in the secondary battery device will be described with reference to FIGS. 6A and 6B. When receiving a signal of requesting to start charging the assembled batteries 11 to 14 from the electric control unit 71 (step ST1), the controlling circuit CTR drives the enable signal shutdown_ena# at the high level (step ST2).

The enable signal shutdown_ena# is driven at the high level so that the shutdown signal shutdown# enters the high level while the path in which the overvoltage of the secondary battery cell is detected is being diagnosed, thereby preventing the erroneous judgment indicating a safety system's abnormality in the electric control unit 71.

As described above, the high level enable signal shutdown_ena# is set in the first flip-flop circuit FF1 after it is confirmed that the controlling circuit CTR is normal by the WDT access signal wdt_feed in the watchdog timer WDT.

Subsequently, in the present embodiment, the initial value of N (natural number of $1 \leq N \leq 4$) is assumed at 1 and the following operations are performed on the N-th assembled battery monitoring circuit, that is, the first assembled battery monitoring circuit 21 to the fourth assembled battery monitoring circuit 24. In each of the assembled battery monitoring circuits 21 to 24, ten secondary battery cells are monitored in their voltage. In the following description, the operation of the assembled battery monitoring circuit 21 will be described as a representative example.

At first, the controlling circuit CTR sets the enable bit for all the secondary battery cells at zero in the assembled battery monitoring circuit 21 (step ST3), and blocks a signal indicative of whether overvoltage occurs in all the secondary battery cells.

Next, the controlling circuit CTR sets the threshold voltage value for overvoltage detection at half a minimum value of the current secondary battery cell voltage in the assembled battery monitoring circuit 21 (step ST4). At this time, the controlling circuit CTR judges whether an input port potential of the confirmation overvoltage alarm signal alarm is at the high level and an input port potential of the shutdown signal shutdown is at the low level (step ST5).

When judging that the input port potential of the confirmation overvoltage alarm signal alarm is at the low level or that the input port potential of the shutdown signal shutdown is at the high level, the controlling circuit CTR outputs a signal for notifying the electric control unit 71 of a safety system's abnormality (step ST6).

When the input port potential of the confirmation overvoltage alarm signal alarm is at the high level and the input port potential of the shutdown signal shutdown is at the low level, the overvoltage detecting path is diagnosed for the respective secondary battery cells 11(1) to 11(10) (step STA).

In other words, the controlling circuit CTR sets the enable bit of the M-th ($1 \leq M \leq 10$) secondary battery cell at 1 (step ST7). Thus, when the operation of the assembled battery monitoring circuit 21 is normal, the low level overvoltage alarm signal alarm1# is output from the assembled battery monitoring circuit 21.

At this time, the controlling circuit CTR judges whether the input port potential of the confirmation overvoltage alarm signal alarm is at the low level and the input port potential of the shutdown signal shutdown is at the low level (step ST8).

When judging that the input port potential of the alarm signal alarm is at the high level or that the input port potential of the shutdown signal shutdown is at the high level, the controlling circuit CTR outputs a signal for notifying the electric control unit 71 of a safety system's abnormality (step ST6).

When the input port potential of the confirmation overvoltage alarm signal alarm is at the low level and the input port potential of the shutdown signal shutdown is at the low level, the enable bit of the M-th secondary battery cell is set at zero again (step ST9).

At this time, the controlling circuit CTR judges whether the input port potential of the confirmation overvoltage alarm signal alarm is at the high level and the input port potential of the shutdown signal shutdown is at the low level (step ST10).

When judging that the input port potential of the confirmation overvoltage alarm signal alarm is at the low level or that the input port potential of the shutdown signal shutdown is at the high level, the controlling circuit CTR outputs a signal for notifying the electric control unit 71 of a safety system's abnormality (step ST6).

The controlling circuit CTR makes the self-diagnosis of the overvoltage detecting path on the respective secondary battery cells 11(1) to 11(10). Thereafter, the controlling circuit CTR returns the threshold voltage for overvoltage detection to a normal value (such as 3.0V) for the assembled battery monitoring circuit 21 (step ST11).

The controlling circuit CTR makes the self-diagnosis on the respective assembled battery monitoring circuits 21 to 24. The controlling circuit CTR diagnoses the operations of the assembled battery monitoring circuits 21 to 24 through the above diagnosing operations.

After the self-diagnosing operations for the assembled battery monitoring circuits 21 to 24 are completed, the controlling circuit CTR drives the enable signal shutdown_ena# at the low level (step ST12). At this time, the blocked (masked) state of the shutdown signal shutdown# is released.

At this time, the controlling circuit CTR judges whether the input port potential of the confirmation overvoltage alarm signal alarm is at the low level and the input port potential of the shutdown signal shutdown is at the low signal (step ST13).

When judging that the input port potential of the confirmation overvoltage alarm signal alarm is at the high level or that the input port potential of the shutdown signal shutdown is at the high level, the controlling circuit CTR outputs a signal for notifying the electric control unit 71 of a safety system's abnormality (step ST6).

Next, the operations of the shutdown signal generating circuit 605 are diagnosed. At first, the controlling circuit CTR drives the diagnosis signal diag_shutdown# at the low level and enters the diagnosis mode of the shutdown signal shutdown (step ST14). In other words, the diagnosis signal diag_shutdown# is driven at the low level so that the output signal of the second AND circuit CB is at the low level at which the overvoltage is detected.

As described above, the low level diagnosis signal diag_shutdown# is set in the second flip-flop circuit FF2 after it is confirmed that the controlling circuit CTR is normal by the WDT access signal wdt_feed in the watchdog timer WDT.

The diagnosis signal diag_shutdown# is driven at the low level to diagnose the operation of the OR circuit CC and the path in which the shutdown signal shutdown# is output to the electric control unit 71.

The shutdown signal shutdown input into the controlling circuit CTR is output to the electric control unit 71 via the connector CN2 and then is supplied to the controlling circuit CTR via the connector CN2.

Thus, the controlling circuit CTR uses the input shutdown signal shutdown to diagnose the safety system so that the operation of the shutdown signal generating circuit 605 and the path in which the shutdown signal shutdown is output from the shutdown signal generating circuit 605 to the electric connector 71 via the connector CN2 can be diagnosed.

The controlling circuit CTR judges whether the input port potential of the confirmation overvoltage alarm signal alarm is at the low level and the input port potential of the shutdown signal shutdown is at the high level (step ST15).

When judging that the input port potential of the confirmation overvoltage alarm signal alarm is at the high level or that the input port potential of the shutdown signal shutdown is at the low signal, the controlling circuit CTR outputs a signal for notifying the electric control unit 71 of a safety system's abnormality (step ST6).

When the input port potential of the confirmation overvoltage alarm signal alarm is at the low level and the input port potential of the shutdown signal shutdown is at the high level, the controlling circuit CTR drives the diagnosis signal diag_shutdown# at the high level and enters the normal mode (step ST16).

At this time, the controlling circuit CTR judges whether the input port potential of the conformation overvoltage alarm signal alarm is at the low level and the input port potential of the shutdown signal shutdown is at the low level (step ST17).

When judging that the input port potential of the confirmation overvoltage alarm signal alarm is at the high level or that the input port potential of the shutdown signal shutdown is at the low level, the controlling circuit CTR outputs a signal for notifying the electric control unit 71 of a safety system's abnormality (step ST6).

When the input port potential of the confirmation overvoltage alarm signal alarm is at the low level and the input port potential of the shutdown signal shutdown is at the low level, the controlling circuit CTR makes a response as to charging start to the electric control unit 71 (step ST18).

Since the high level shutdown signal shutdown is supplied to the electric control unit 71 in the diagnosis mode in step 14 but the high level shutdown signal shutdown having a short pulse width until the normal mode is set in step S16 is output to the electric control unit 71 after the states of the shutdown signal shutdown and the confirmation overvoltage alarm signal alarm are confirmed, the shutdown signal is judged as the self-diagnosis signal in the electric control unit 71 and the shutdown processing is not erroneously performed due to the signal.

The self-diagnosis is made as described above so that the shutdown signal shutdown is blocked (masked) due to the diagnosis for the plurality of secondary battery cells and the shutdown signal shutdown is not output per diagnosis of a secondary battery cell in the secondary battery device comprising a plurality of secondary battery cells. Thus, the electric control unit 71 can prevent the shutdown processing from being erroneously performed due to the shutdown signal shutdown having a short pulse width for diagnosis.

Since the diagnosis signal diag_shutdown# is used to make self-diagnosis on the device and the path for outputting the shutdown signal, even when the shutdown signal is blocked during the diagnosis as described above, the reliability of the self-diagnosis is not reduced.

Further, when there is considered a case in which a failure of the shutdown signal generating circuit 605 is not detected by the self-diagnosis, the output signal may oscillate at a high frequency due to an open (noncontact state) failure of the input pints of the shutdowns signal generating circuit 605.

When the controlling circuit CTR reads the output signal oscillating at a high frequency, a probability that a low level output signal is read and a probability that a high level output signal is read are simply 0.5, and when a desired value is not read by the self-diagnosis, majority vote is taken by having a lead twice, consequently a probability that an abnormal state is erroneously judged to be a normal state is 0.625.

In the self-diagnosis in the secondary battery device according to the present embodiment, the signal level is confirmed three times in the order of the low level, the high level and the low level of the confirmation overvoltage alarm signal alarm. Thus, a probability that all the self-diagnosis slips through the ten secondary battery cells is $0.625^{30} = 7.5 \times 10^{-7}$, which is substantially negligible.

In other words, according to the self-diagnosis algorithm, the generation of the alarm signal for all the secondary battery cells is diagnosed so that an open failure of the input pins into which the output signals of the assembled battery monitoring circuits 21 to 24 are input or an open failure of the input pin of the enable signal shutdown_ena# are essentially detected.

The design in which the shutdown signal shutdown# is blocked (masked) based on the enable signal shutdown_ena# driven by the controlling circuit CTR can lead the shutdown signal shutdown# to be masked when needed, but the controlling circuit CTR confirms the output states of both the shutdown signal shutdown# output from the shutdown signal generating circuit 605 and the confirmation overvoltage alarm signal alarm during the self-diagnosis so that the reliability of the self-diagnosis can be enhanced.

As described above, in the secondary battery device according to the present embodiment and the vehicle comprising the secondary battery device, a probability that the diagnosis slips through can be reduced by making a diagnosis per input point into the sensor in the safety system having many input points into the sensor.

Further, the operational reliability of the enable signal shutdown_ena# by the shutdown signal generating circuit 605 can be ensured and an unwanted pulse of the shutdown signal shutdown can be prevented from being sent to the electric control unit 71, thereby avoiding erroneous shutdown of the system.

In other words, in the secondary battery device according to the present embodiment and the vehicle comprising the secondary battery device, there can be provided the secondary battery device comprising a highly reliable safety system for preventing the upper controlling circuit from erroneously shutting down during self-diagnosis and the vehicle comprising the secondary battery device.

The present invention is not limited to the above embodiment, and the constituents may be modified and embodied without departing from the spirit in practice. For example, in the above embodiment, the threshold voltage compared with the secondary battery cell voltage in the comparator COM is set half the minimum value of the plurality of secondary battery cell voltages in the self-diagnosing operations of the assembled battery monitoring circuits 21 to 24, but the threshold voltage value may be set to be smaller than the minimum value of the plurality of secondary battery cell voltages.

In the above embodiment, the shutdown signal is output from the shutdown signal generating circuit 605 and then is inverted, but may be output to the electric control unit (upper controller) 71 via the connector CN2 without being inverted.

A plurality of constituents disclosed in the above embodiment can be appropriately combined to make various inventions. For example, some constituents may be deleted from all the constituents shown in the embodiment. Furthermore, the constituents over different embodiments may be appropriately combined.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A secondary battery device comprising:
    an assembled battery comprising a plurality of secondary battery cells;
    a voltage detector configured to detect respective voltages of the plurality of secondary battery cells;
    a diagnosing circuit configured to output an secondary battery cells detected by the voltage detector are an overvoltage that is equal to or more than a predetermined threshold value;
    a shutdown signal generating circuit configured to output a first level shutdown signal to an upper controller when it is judged that any of the secondary overvoltage alarm signal for notifying whether the respective voltage values of the plurality of battery cells is overvoltage by the overvoltage alarm signal; and
    a controlling circuit configured to be supplied with the shutdown signal and to control operations of the diagnosing circuit and the shutdown signal generating circuit;
    wherein the shutdown signal generating circuit is configured to set the shutdown signal at a second level when a self-diagnosis is made on the diagnosing circuit, and to output a confirmation overvoltage alarm signal for notifying the controlling circuit of the overvoltage when the overvoltage alarm signal for notifying the overvoltage is supplied;
    wherein the diagnosing circuit comprises:
        a plurality of comparing modules configured to compare the respective voltages of the plurality of secondary battery cells with a predetermined threshold voltage;
        a plurality of first logic circuits configured to be supplied with output signals of the comparing modules, to output the output signals of the comparing modules when a signal supplied from an enable register is at a first level, and to output a second level signal when the signal supplied from the enable register is at a second level; and
        a second logic circuit configured to output a second level signal when any of the output signals of the plurality of first logic circuits is at the first level, and
        when making a self-diagnosis on the diagnosing circuit, the controlling circuit is configured to set all the output signals of the plurality of enable registers at the second level, to set the predetermined threshold voltage value to be smaller than a minimum value of the voltage values of the plurality of secondary battery cells, and to sequentially set the output signals of the plurality of enable registers at the first level; and
    wherein the shutdown signal generating circuit comprises:
        a third logic circuit configured to be input the plurality of overvoltage alarm signals, to output a second level signal when any of the plurality of overvoltage alarm signals is at the second level, and to output a first level signal when all the plurality of overvoltage alarm signals are at the first level;
        a fourth logic circuit configured to be supplied with the output signal of the third logic circuit and a diagnosis signal output from the controlling circuit, to output a second level signal when the output signal of the third logic circuit or the diagnosis signal is at the second level, and to output a first level signal when the output signal of the third logic circuit and the diagnosis signal are at the first level;
        a fifth logic circuit configured to be supplied with the output signal of the fourth logic circuit and an enable signal output from the controlling circuit, to output a first level signal when the output signal of the fourth logic circuit or the enable signal is at the first level, and to output a second level signal when the output signal of the fourth logic circuit and the enable signal are at the second level; and
        a sixth logic circuit configured to be supplied with the output signal of the fourth logic circuit and the enable signal, to output a second level signal when the output signal of the fourth logic circuit and the enable signal are at the second level, and to output a first level signal when the output signal of the fourth logic circuit and the enable signal are at the first level; and
    wherein when making a self-diagnosis on the diagnosing circuit, the controlling circuit drives the enable signal at the first level.

2. The secondary battery device according to claim 1, wherein the shutdown signal generating circuit further comprises a watchdog timer configured to judge whether the controlling circuit operates normally, and
    wherein the shutdown signal generating circuit is configured to supply the first level enable signal to the fifth logic circuit after the watchdog timer confirms that the controlling circuit operates normally.

3. The secondary battery device according to claim 1, wherein the shutdown signal generating circuit further comprises a watchdog timer configured to judge whether the controlling circuit operates normally, and
    wherein the shutdown signal generating circuit is configured to supply the second level diagnosis signal to the fourth logic circuit after the watchdog timer judges that the controlling circuit operates normally.

4. The secondary battery device according to claim 1, wherein the output signal of the fifth logic circuit is supplied as the shutdown signal to the upper controller via a connector, and is supplied again from the upper controller to the controlling circuit in a path via the connector.

5. A vehicle comprising:
    the secondary battery device according to claim 1; and
    an axle configured to be driven by power of the secondary battery device.

* * * * *